Aug. 3, 1937.  G. E. STANLEY  2,088,979

TORSIONAL SHOCK ABSORBER

Filed March 17, 1937

Inventor
George Enoch Stanley
by Mawhinney & Mawhinney
Attorneys.

Patented Aug. 3, 1937

2,088,979

UNITED STATES PATENT OFFICE 2,088,979

TORSIONAL SHOCK-ABSORBER

George Enoch Stanley, Coventry, England

Application March 17, 1937, Serial No. 131,495
In Great Britain March 16, 1936

6 Claims. (Cl. 192—68)

This invention relates to torsional shock-absorbers, particularly for use in the transmission systems of motor-vehicles, of the kind comprising co-axial relatively angularly-movable co-acting members jointly providing a circle of elongated chambers which contain resilient means compressible when relative angular movement occurs (either during the drive or the recoil) between the co-acting members.

My main object is to provide an improved absorber which will be satisfactory for the work to which it is to be put and will operate for a long period without requiring attention or having to have any of its parts replaced.

According to the invention, the resilient means comprise V-like springs and resilient blocks internally engaging the spring arms near the free ends thereof and spaced from the bridging portions of the springs, the chambers being substantially of trapezium shape to receive such springs. Conveniently the springs are radially arranged with the free ends of the arms outwardly. The blocks are preferably rubber cylinders of a diameter greater than the maximum distance between the adjacent faces of the springs.

In the accompanying drawing:—

Figure 1:
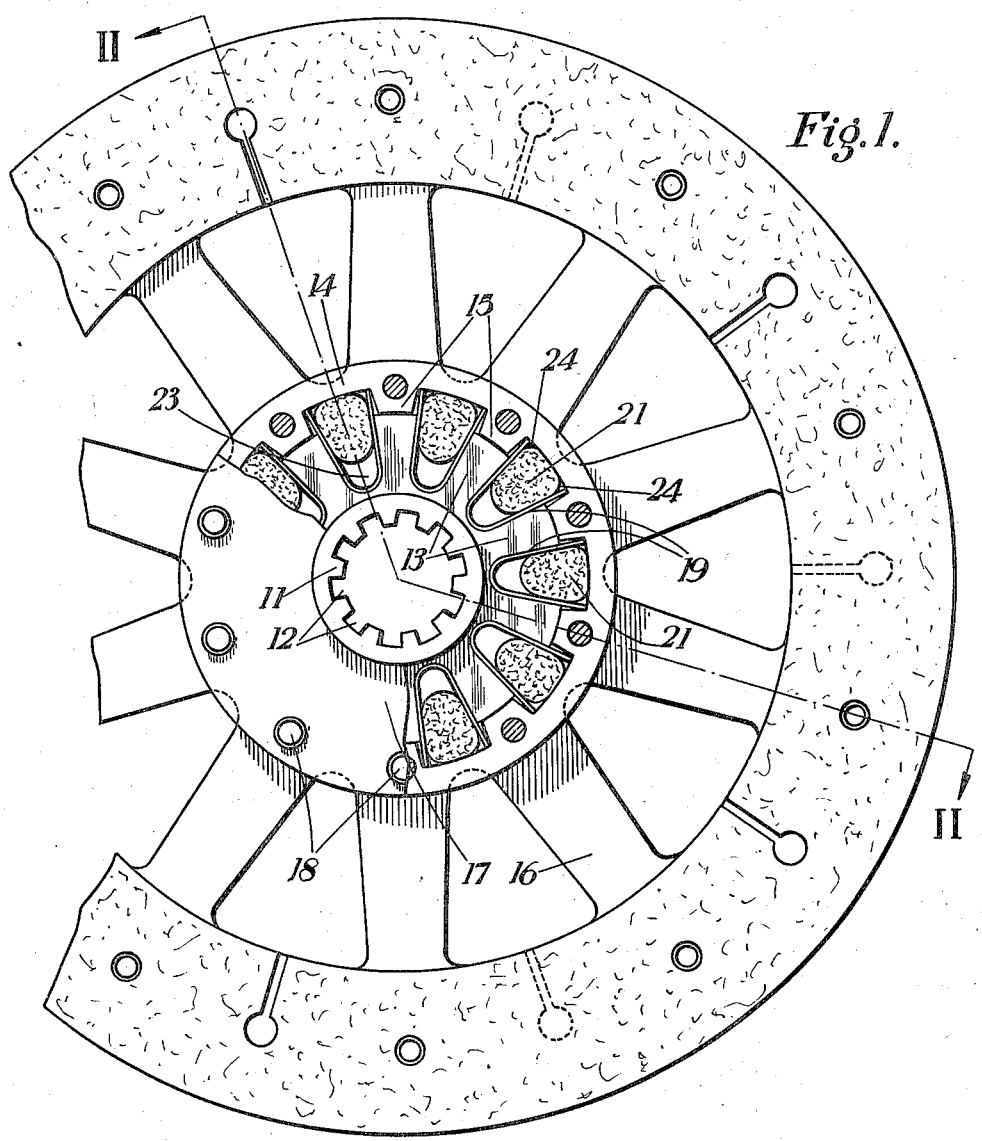
Figure 2:
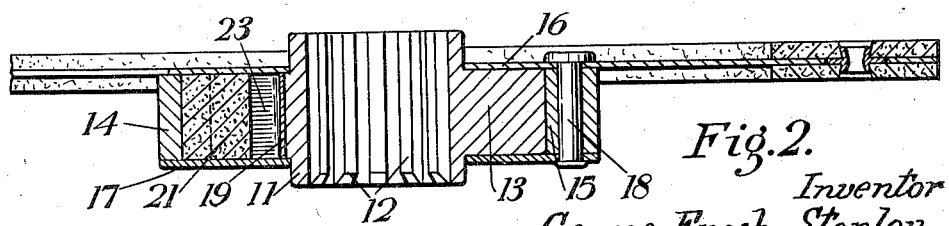

Figure 1 is a part-sectional elevation of a clutch plate incorporating a torsional shock-absorber according to the invention; and Figure 2 is a cross-section thereof on the line II—II of Figure 1.

In the construction illustrated, where the shock-absorber is embodied in the driven disc of a plate clutch, there is a hub centre 11 (which forms one of the said co-acting members) provided with internal grooves 12 slidingly to receive corresponding splines on the driven clutch shaft, and this hub centre is of star-form having a plurality of radiating arms 13—for example, ten. Disposed round this is the other co-acting member, an annular one 14 with a similar number of internally-extending arms 15, such that when the two members are appropriately positioned with the arms radially in line they jointly provide a circle of more or less triangular or trapezium-shaped elongated chambers. The axially-outer ends of the chambers are closed, respectively, by the clutch disc 16 and an end plate 17 riveted at 18 or otherwise secured to one another and to the outer co-acting member.

Disposed in the chambers are V-shaped springs 19 the free ends of the arms of which extend radially outwardly into the shallow recesses between the arms 15. These arms are shaped, it will be observed, so that the mouths of these recesses have clearance from the spring arms. The spring arms are in planes which substantially intersect one another at the axis of the members 11 and 14. The recesses between the arms 13 of the inner member are curved snugly to receive the bridging portions of the springs. Internally the free ends of the spring arms are engaged over a material area by cylindrical blocks of rubber 21 under compression. These latter and the V-springs extend in a direction axially of the clutch between the clutch disc and the end plate.

In the example illustrated the diameter of the blocks 21 is 1″, and the distance apart of the arms of a spring (from the external surfaces of the arms) is also 1″, the thickness of each spring arm being about $\frac{1}{32}$″, so that the maximum distance between the adjacent faces of the spring arms is $1\frac{15}{16}$″, which is $\frac{1}{16}$″ less than the diameter of a block 21.

In operation, when the drive is applied to the outer member 14, one arm of each of the V springs is compressed towards the other, loading the associated resilient member substantially throughout its length and causing it to extend radially inwardly towards the space 23 adjacent the bridging portion of the spring and slightly more into the corners 24.

In this way very satisfactory results are obtained and the springs are not subjected to such loads as tend to break them, being internally supported by the resilient blocks where the forces are applied, and inequalities arising in manufacture are taken care of by the resilient springs and blocks.

What I claim as my invention and desire to secure by Letters Patent of the United States is:—

1. A torsional shock-absorber, particularly for use in the transmission system of a motor-vehicle, comprising co-axial relatively angularly-movable coacting members arranged one outside the other and jointly providing a circle of elongated trapezium-shaped chambers, the side walls of said chambers lying in planes which substantially intersect one another at the axis of said members and the radially-inner walls being smoothly curved, V-shaped springs with U-shaped bridging portions fitting snugly against said curved inner walls and with arms lying adjacent said side walls, and a rubber block disposed internally of each spring towards the outer end thereof and spaced from the bridging portion thereof.

2. A torsional shock-absorber, particularly for use in the transmission system of a motor-vehicle, comprising co-axial relatively angularly-movable coacting members arranged one outside the other and jointly providing a circle of elongated trapezium-shaped chambers, the side walls of said chambers lying in planes which substantially intersect one another at the axis of said members and the radially-inner walls being smoothly curved, V-shaped springs with U-shaped bridging portions fitting snugly against said curved inner walls and with arms lying adjacent said side walls, and a rubber cylinder disposed internally of each spring towards the outer end thereof and spaced from the bridging portion thereof, said rubber cylinder having a diameter greater than the maximum distance between the adjacent faces of the arms of the associated spring so as to be held in a state of compression thereby.

3. A torsional shock-absorber, particularly for use in the transmission system of a motor-vehicle, comprising relatively angularly-movable co-acting members arranged one outside the other, the inner of said members having outwardly-extending arms and the outer of said members having inwardly-extending arms, said members disposed with the arms of one radially in line with the arms of the other, respectively, said arms arranged jointly to provide a circle of elongated trapezium-shaped chambers with one wall thereof smoothly curved, V-shaped springs having bridging portions fitting snugly in the curved walls of said chambers and with their arms extending into the corners of the opposite walls of said chambers, the mouths of the recesses which receive the free ends of the arms of said springs having clearance from the spring arms, and a rubber block disposed internally of each spring towards the free ends of the arms thereof and spaced from the bridging portion thereof, said rubber blocks being held in a state of compression between said spring arms.

4. A torsional shock-absorber, particularly for use in the transmission system of a motor-vehicle, comprising relatively angularly-movable co-acting members arranged one outside the other, the inner of said members having outwardly-extending arms with between them substantially U-shaped recesses, the outer of said members having inwardly-extending arms leaving between them relatively shallow recesses, said members disposed with the recesses of one radially in line with the recesses of the other, respectively, V-shaped springs with U-shaped bridging portions mounted with said bridging portions fitting snugly in the recesses in the inner member and with their free ends extending into the corners of the recesses in the outer member, the mouths of said latter recesses having clearance from the spring arms, and a rubber cylinder disposed internally of the arms of each spring towards the free ends thereof, said rubber cylinder having a diameter greater than the maximum distance between the adjacent faces of the arms of the associated spring so as to be held in a state of compression thereby.

5. A torsional shock-absorber, particularly for use in the transmission system of a motor-vehicle, comprising co-axial relatively angularly-movable co-acting members arranged one outside the other, the inner of said members having outwardly-extending arms with between them substantially U-shaped recesses, the outer of said members having inwardly-extending arms leaving between them relatively shallow recesses, said members disposed with the recesses of one radially in line with the recesses of the other, respectively, to form a circle of elongated trapezium-shaped chambers about the axis of said members, V-shaped springs with U-shaped bridging portions fitting snugly in the recesses of the inner member and with their arms extending into the corners of the recesses of the outer member, the mouths of said latter recesses having clearance from the spring arms, a rubber block disposed internally of the arms of each spring towards the free ends thereof, said rubber block being held in a state of compression thereby, and means closing the ends of said chambers, said springs and blocks extending between said end-closing means.

6. A clutch disc incorporating at its centre a torsional shock-absorber, comprising relatively angularly-movable co-acting members arranged one outside the other, the inner of said members having outwardly-extending arms with between them substantially U-shaped recesses, the outer of said members having inwardly-extending arms leaving between them relatively shallow recesses, said members disposed with the recesses of one radially in line with the recesses of the other, respectively, to provide a circle of substantially triangular chambers, V-shaped springs with U-shaped bridging portions mounted with said bridging portions fitting snugly in the recesses in the inner member and with their arms extending into the corners of the recesses in the outer member, said clutch disc secured to said outer member to close said chambers at one end, a plate secured to said outer member to close said chambers at the other end, and a rubber cylinder disposed internally of each spring towards the free ends thereof and spaced from the bridging portion thereof, said rubber cylinder having a diameter greater than the maximum distance between the adjacent faces of the arms of the associated spring so as to be held in a state of compression thereby.

GEORGE E. STANLEY.